July 31, 1934.  B. F. DONNER  1,968,749
AUTOMOBILE TURNING INDICATOR
Filed Oct. 5, 1931   2 Sheets-Sheet 1
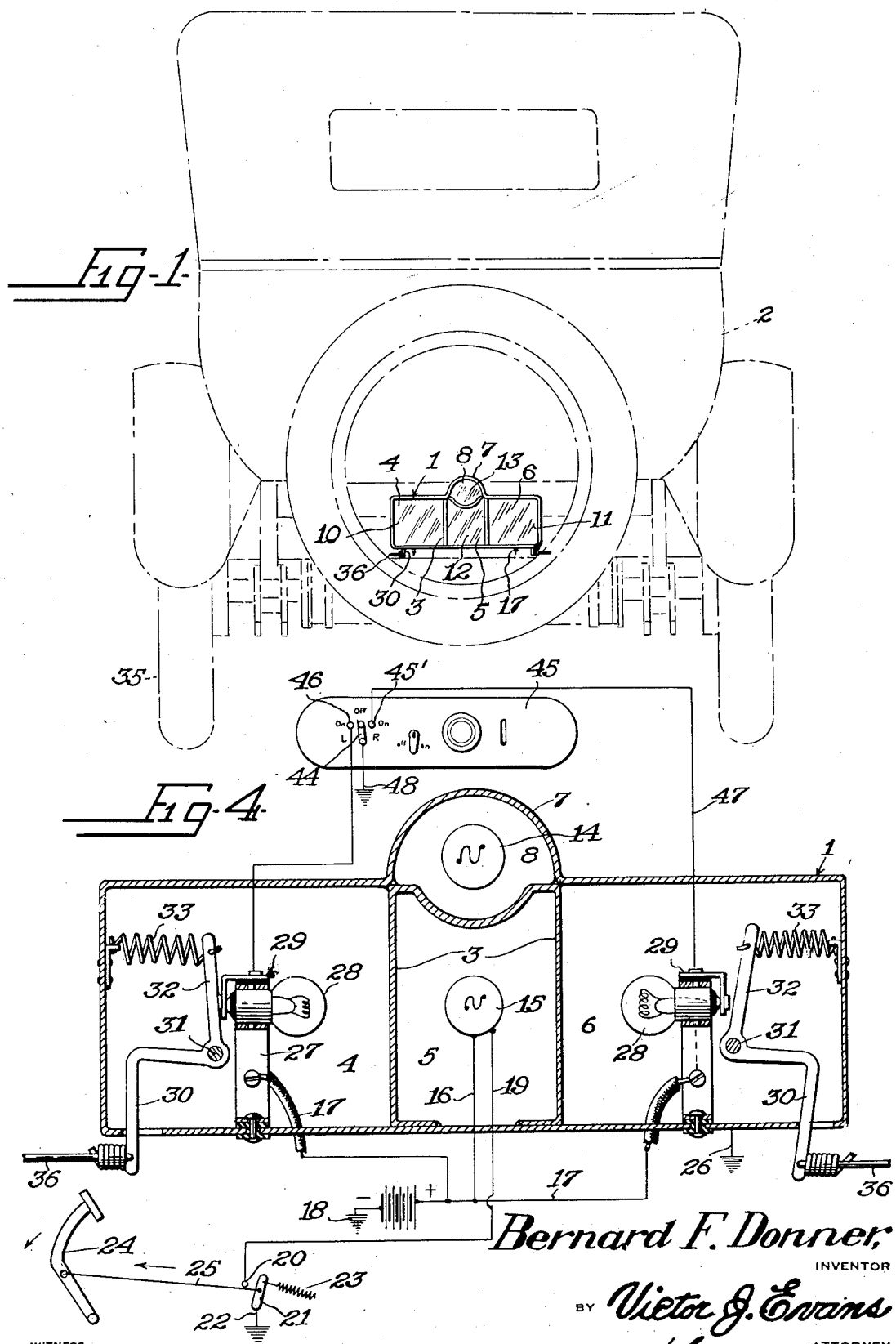
Bernard F. Donner,
INVENTOR
BY Victor J. Evans
and Co.  ATTORNEY July 31, 1934.  B. F. DONNER  1,968,749
AUTOMOBILE TURNING INDICATOR
Filed Oct. 5, 1931   2 Sheets-Sheet 2
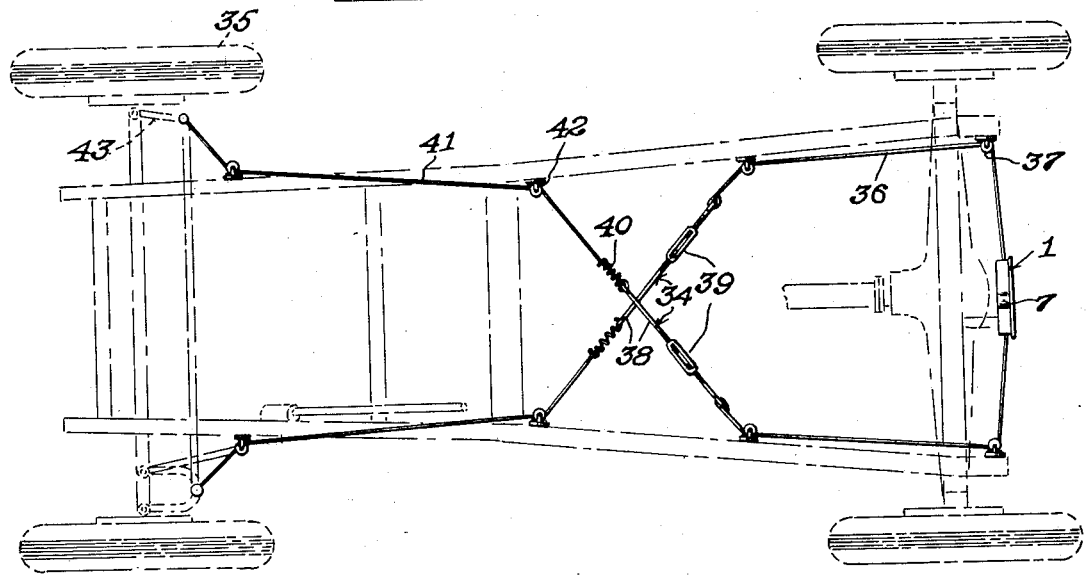
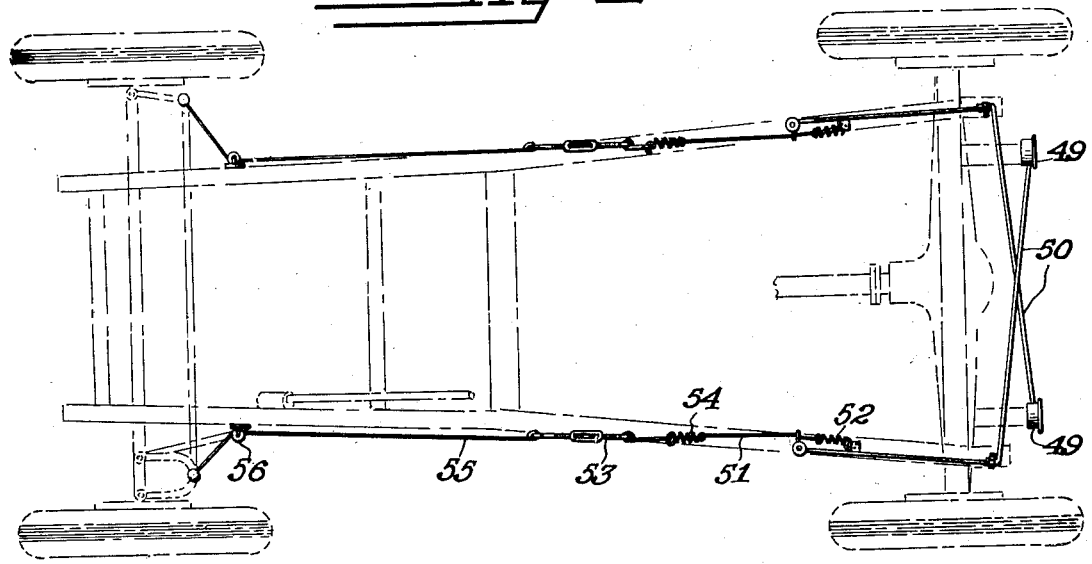
Bernard F. Donner,
INVENTOR
BY Victor J. Evans
and Co.   ATTORNEY Patented July 31, 1934

1,968,749

UNITED STATES PATENT OFFICE 1,968,749

AUTOMOBILE TURNING INDICATOR

Bernard F. Donner, Algiers, La.

Application October 5, 1931, Serial No. 567,051

1 Claim. (Cl. 177—339)

This invention relates to indicators for motor vehicles especially adapted for indicating to traffic in the vicinity thereof, turns to the left or right and the slowing down or stopping of the vehicle, thereby reducing accidents to a minimum.

Another object of this invention is the provision of signals of different colors for indicating right and left hand turns and a stop by the respective vehicle which are automatically controlled through the ordinary driving of said vehicle, so that the signals will be displayed or actuated without any undue effort on the part of the operator.

With these and other objects in view, this invention consists in certain novel features of construction, combination and arrangement of parts to be hereinafter more fully described and claimed.

For a complete understanding of my invention, reference is to be had to the following description and accompanying drawings, in which Figure 1 is a rear elevation of a motor vehicle illustrating an indicator applied thereto and constructed in accordance with my invention.

Figure 2 is a plan view illustrating the operating means between the indicator and the front wheels of the vehicle.

Figure 3 is a similar view illustrating a modified form of operating means.

Figure 4 is a sectional view illustrating the indicator and the wiring diagram therefor.

Referring in detail to the drawings, the numeral 1 indicates a casing adapted to be mounted upon the rear end of a motor vehicle 2 as shown in Figure 1 of the drawings and is provided with partitions 3 forming compartments 4, 5 and 6. The top wall of the casing is offset as shown at 7 to form a compartment 8 and the latter is separated from the compartment 5 by a partition 9. The compartment 4 is closed by a panel 10 preferably of green color to indicate a left hand turn while the compartment 6 is closed by a panel 11 preferably of clear glass to display a white light when illuminated to indicate a right hand turn. The compartment 5 is closed by a panel 12, of amber or any other suitable color for the purpose of indicating a stop signal. The compartment 8 is closed by a panel 13 of red color providing the usual tail light. An electric lamp 14 is arranged in the compartment 8 and is electrically connected to the lighting system of the motor vehicle. An electric lamp 15 is mounted in the compartment 5 and is adapted to be illuminated during the applying of the vehicle's brakes for the purpose of indicating a stop or slowing down of the vehicle. A conductor 16 is connected to the electric lamp and to a conductor 17 which is in turn connected to the battery or other electrical source of the vehicle. The battery is connected to a ground 18. A conductor 19 is connected to the lamp 15 and to a contact 20 of a switch 21. The switch 21 is connected to the ground as shown at 22. The switch is normally urged into a circuit breaking position by a spring 23 and is connected to the brake pedal 24 of the vehicle by an element 25. The depressing of the brake pedal 24 to apply the brakes of the vehicle will move the switch into circuit closing position completing the electric circuit to the electric lamp 15. The casing 1 is connected to the ground as shown at 26.

Supporting brackets 27 are mounted in the compartments 4 and 6 of the casing and insulated from the latter and carry electric lamps 28. The electric lamps 28 are electrically connected to the brackets 27 and the latter are electrically connected to the conductor 17. Spring contacts 29 are mounted on the brackets 27 and insulated therefrom and are in engagement with the bases of the electric lamps 28. Operating levers 30 are pivotally mounted in the casing as shown at 31 and are provided with extensions 32 lying in close proximity to the contacts 29 and normally urged away from said contacts by springs 33 secured thereto and to the casing. The levers 30 extend through the slots in the bottom wall of the casing and are connected to an operating means 34 associated with the front wheels 35 of the motor vehicle. The operating means 34 is adapted to actuate the levers 31 independently of each other, that is, one of the front wheels actuates one of the levers while the other front wheel actuates the other lever. When the levers are rocked on their pivots by the operating means 34 they move into engagement with the contacts 29 completing the electric circuit to the lamps.

The operating means 34 includes rear flexible elements 36 which are connected to the levers 30 and are trained over guide pulleys 37 mounted on the frame of the vehicle and are connected to rods 38 provided with turn buckles 39 and said rods cross each other as shown in Figure 2 and are connected to coiled springs 40. Flexible elements 41 are connected to the springs 40 and are trained over pulleys 42 and are connected to the steering arms 43 of the front wheels 35. By referring to Figure 2 it will be seen that the left front wheel operates the signal to indicate a turn to the right while the right front wheel operates the signal to indicate a turn to the left.

A switch 44 is mounted on the instrument board 45 of the vehicle and has associated therewith contacts 45' and 46. The contacts 45' and 46 are electrically connected to the contacts 29 by conductors 47. When the switch 44 is moved to engage the contact 45' the electric circuit is completed to the electric lamp 28 to indicate a right turn and when the switch 44 is in engagement with the contact 46, the other electric lamp 28 is illuminated to indicate a left hand turn. Thus it will be seen that the operator may give a signal manually when desired. The switch 44 is connected to the ground, as shown in Figure 4, by a conductor 48.

Referring to my modified form of invention as shown in Figure 3 the right and left hand signals may be mounted in supporting casings 49 and located at the rear of the vehicle and the operating levers 30 thereof are connected to flexible elements 50 which cross each other and pass over guides carried by the frame of the vehicle and in turn connected to elements 51. The rear ends of the elements 51 are connected to the frame of the vehicle by springs 52 and the forward ends are connected to turn buckles 53 by springs 54. The turn buckles are connected to the steering arms 43 of the front wheels by flexible elements 55 trained over guide pulleys 56 mounted on the frame of the vehicle. The purpose of the springs 40 and 54 is to permit the front wheels to turn the limit of their movements without unduly moving the operating levers 30 of the signals, that is, after the operating levers have moved into circuit closing position, further movements of the front wheels will be taken care of by said springs.

While I have shown and described the preferred embodiment of my invention, it will be understood that minor changes in construction, combination and arrangement of parts may be made without departing from the spirit and scope of my invention, as claimed.

Having thus described my invention, what I claim is:—

An indicator comprising a signal casing electrically connected to an electrical source, a bracket in said casing and insulated therefrom and electrically connected to the electrical source, an electric lamp carried by the bracket, a spring contact engaging the lamp and supported by and insulated from the bracket, a bell crank lever pivoted in the casing and having one arm portion thereof extending exteriorly of the casing for connection to a steering mechanism and its other arm portion adapted to move into and out of engagement with the spring contact, and a spring means connected to the last-named arm of the bell crank lever for normally positioning the lever out of engagement with the spring contact, and a manually controlled switch connected to the electrical source and to the spring contact.

BERNARD F. DONNER.